(12) United States Patent
Oguni et al.

(10) Patent No.: US 11,338,475 B2
(45) Date of Patent: May 24, 2022

(54) FIBER-REINFORCED RESIN COMPOSITION

(71) Applicant: Daicel Polymer Ltd., Tokyo (JP)

(72) Inventors: Toshio Oguni, Himeji (JP); Masahiko Itakura, Tokyo (JP)

(73) Assignee: DAICEL POLYMER LTD.

( * ) Notice: Subject to any disclaimer, the term of this patent is extended or adjusted under 35 U.S.C. 154(b) by 99 days.

(21) Appl. No.: 15/311,365

(22) PCT Filed: May 1, 2015

(86) PCT No.: PCT/JP2015/063053
§ 371 (c)(1),
(2) Date: Nov. 15, 2016

(87) PCT Pub. No.: WO2015/194271
PCT Pub. Date: Dec. 23, 2015

(65) Prior Publication Data
US 2017/0072596 A1 Mar. 16, 2017

(30) Foreign Application Priority Data

Jun. 18, 2014 (JP) .............................. JP2014-124978
Jul. 31, 2014 (JP) .............................. JP2014-155712

(51) Int. Cl.
*C08J 5/04* (2006.01)
*C08L 23/12* (2006.01)
(Continued)

(52) U.S. Cl.
CPC .............. *B29B 15/122* (2013.01); *C08J 5/04* (2013.01); *C08L 1/24* (2013.01); *C08L 23/10* (2013.01);
(Continued)

(58) Field of Classification Search
CPC ........ B29B 15/122; C08L 77/06; C08L 77/02; C08L 23/12; C08L 1/24; C08L 2205/16;
(Continued)

(56) References Cited

U.S. PATENT DOCUMENTS

2008/0020205 A1  1/2008  Fink et al.
2010/0009158 A1*  1/2010  Imaizumi .............. B29C 48/022
                                                                  428/222

(Continued)

FOREIGN PATENT DOCUMENTS

JP  06-002344 B2  1/1994
JP  06-114832 A   4/1994
(Continued)

OTHER PUBLICATIONS

Comparative Characterisation Of Man-Made Regenerated Cellulose Fibres, by Thomas Röder et al., Lenzinger Berichte 87, 2009, pp. 98-105 (Röder) (Year: 2009).*

(Continued)

*Primary Examiner* — Jeremy R Pierce
*Assistant Examiner* — Christine X Nisula
(74) *Attorney, Agent, or Firm* — Flynn Thiel, P.C.

(57) ABSTRACT

A fiber-reinforced resin composition contains a resin-adhered long fiber bundle including composition (A), a thermoplastic resin, and component (B), a rayon fiber, wherein the rayon fiber of component (B) satisfies the following requirements (b1), (b2) and (b3), and the resin-adhered long fiber bundle is obtained by adhering and integrating the thermoplastic resin of component (A) in a molten state to and with a strand of longitudinally-arranged rayon fibers of component (B), and cutting the strand into a length of 3 to 30 mm, (Continued)

(b1) a fiber diameter of 5 to 30 μm;
(b2) a tensile elongation of 10% or more; and
(b3) a flat shape with a ratio between a major axis length and a minor axis length (major axis length/minor axis length) in a width-directional cross-section of 1.1 or more.

9 Claims, 4 Drawing Sheets

(51) Int. Cl.
| | |
|---|---|
| C08L 77/06 | (2006.01) |
| C08L 77/02 | (2006.01) |
| C08L 23/10 | (2006.01) |
| C08L 51/06 | (2006.01) |
| B29B 15/12 | (2006.01) |
| C08L 1/24 | (2006.01) |
| B29K 23/00 | (2006.01) |
| B29K 77/00 | (2006.01) |
| B29K 201/00 | (2006.01) |

(52) U.S. Cl.
CPC ............... *C08L 23/12* (2013.01); *C08L 51/06* (2013.01); *C08L 77/02* (2013.01); *C08L 77/06* (2013.01); *B29K 2023/12* (2013.01); *B29K 2077/00* (2013.01); *B29K 2201/08* (2013.01); *C08L 2205/16* (2013.01)

(58) Field of Classification Search
CPC ......... C08J 5/04; C08J 5/045; B29K 2023/12; B29K 2077/00; B29K 2201/08; B29K 2001/00; Y10T 428/2973; Y10T 442/609; Y10T 442/3114; Y10T 442/611; D01D 5/253; D03D 15/0088; D03D 15/0083; D04H 1/4391; D04H 3/018; D04H 1/49312; D10B 2505/02; B29C 70/06; B29C 70/10; D01F 2/00
USPC ..... 428/299.7, 397; 442/192, 195, 309, 335, 442/337
See application file for complete search history.

(56) References Cited

U.S. PATENT DOCUMENTS

| | | | | |
|---|---|---|---|---|
| 2010/0021711 | A1* | 1/2010 | Schrempf | D01D 5/253 428/221 |
| 2010/0288459 | A1* | 11/2010 | Ito | D21F 1/0027 162/289 |
| 2014/0343196 | A1* | 11/2014 | Kousaka | C08J 5/04 524/35 |
| 2015/0025180 | A1* | 1/2015 | Monden | C08K 7/06 524/116 |

FOREIGN PATENT DOCUMENTS

| | | | |
|---|---|---|---|
| JP | 06-293023 A | 10/1994 | |
| JP | 06-313050 A | 11/1994 | |
| JP | 07-205317 A | 8/1995 | |
| JP | 07-216104 A | 8/1995 | |
| JP | 07-251437 A | 10/1995 | |
| JP | 07278959 A * | 10/1995 | |
| JP | 08-118490 A | 5/1996 | |
| JP | 09-031744 A | 2/1997 | |
| JP | 09-256216 A | 9/1997 | |
| JP | 2007-176227 A | 7/2007 | |
| JP | 2008-013693 A | 1/2008 | |
| JP | 2008-202012 A | 9/2008 | |
| JP | 2009-191234 A | 8/2009 | |
| JP | 2011-214217 A | 10/2011 | |
| JP | 2012-057289 A | 3/2012 | |
| JP | 2012-57289 A | 3/2012 | |
| JP | 2013-091775 A | 5/2013 | |
| JP | 202084382 A | 6/2020 | |
| WO | WO-2010071906 A1 * | 7/2010 | ............... D01F 2/00 |
| WO | WO 2013/051369 A1 | 4/2013 | |
| WO | WO-2013051369 A1 * | 4/2013 | ............... C08J 5/04 |
| WO | WO 2014/185243 A1 | 11/2014 | |

OTHER PUBLICATIONS

Espacenet translation of JPH07278959A, accessed on Aug. 12, 2019. (Year: 1995).*
Espacenet translation of WO-2010071906-A1. (Year: 2010).*
Lexico, "Monofilament". (Year: 2020).*
International Search Report for PCT/JP2015/063053 (2 pgs.).
English translation of International Preliminary Report on Patentability issued in Application No. PCT/JP2015/063053 dated Dec. 20, 2016 (1 page).
English translation of Written Opinion of the International Searching Authority issued in Application No. PCT/JP2015/063053 dated Jul. 21, 2015 (3 pages).
Comparative Characterisation of Man-Made Regenerated Cellulose Fibres, by Thomas Röder et al, Lenzinger Berichte 87, 2009, pp. 98-105.
Extended European Search Report for corresponding application No. 15809957.2, dated Nov. 20, 2017, 10 pgs.
Novel Thermoplastic Composites from Commodity Polymers and Man-Made Cellulose Fibers, by Hans-Peter Fink et al, Macromolecular Symposia, vol. 244, No. 1., Dec. 2006, pp. 107-118.
Novel cellulose fibre reinforced thermoplastic materials, by Johannes Ganster et al, Cellulose, Kluwer Academic Publishers, vol. 13, No. 3, Apr. 2006, pp. 271-280.
Cellulose man-made fibre reinforced polypropylene-correlations between fibre and composite properties, by Johannes Ganster et al, Cellulose, Kluwer Academic Publishers, vol. 15, No. 4, Feb. 2008, pp. 561-569.
Rudolf Einsiedel et al., Cordenka Reinforced PLA-Advanced Bio-Derived Composite Material, 68th Annual Technical Conference of the Society of Plastic Engineers, 2010, pp. 2266-2271, vol. 3 of 3, Orlando Florida (7 pages).
Johannes Ganster et al., Polimery, Czasopismo Poświęcone Chemii, Technologii i Przetwórstwu Polimerów, 2013, vol. 58, No. 6, pp. 423-434 (12 pages).
Kinichi Okumura et al., Long-fiber Reinforced Thermoplastics for Automobile Applications, Kobe Steel Engineering Reports, vol. 47, No. 2 (Sep. 1997), pp. 73-76 with partial English Translation (5 pages).
Notice of Dispatch of Duplicates of a Written Opposition with English Translation for corresponding Japanese Patent Application 2018-166598 (U.S. Pat. No. 6,711,876) dated Jan. 27, 2021 (2 pages).
Notice of Reasons for Revocation with English translation for corresponding JP Application No. 2018-166598 (U.S. Pat. No. 6,711,876), dated Apr. 1, 2021 (52 pages).

* cited by examiner

FIBER-REINFORCED RESIN COMPOSITION

TECHNICAL FIELD

The present invention relates to a fiber-reinforced resin composition, which can provide a lightweight molded article with good mechanical properties; and a molded article obtained therefrom.

BACKGROUND ART

Resin molded articles are used as a metal substitute for the purpose of weight reduction, and in order to enhance their mechanical strengths, molding of a resin composition having a fiber blended therewith is known.

JP-A 2008-013693 discloses an invention of a long fiber-reinforced thermoplastic resin composition for automobile outer plate members obtained by blending 25 to 200 parts by weight of a reinforcement fiber relative to 100 parts by weight of a composition containing a thermoplastic polyurethane resin (TPU) and a styrene-based resin (SR) in a weight ratio (TPU/SR) of 20/80 to 90/10.

It discloses to contain, as a reinforcement fiber, at least one kind of fibers selected from the group consisting of inorganic fibers made of glass, carbon, silicon carbide, basalt or boron; metal fibers made of stainless steel; and organic fibers made of aramid, rayon, nylon, polynaphthalate, polyester, or cellulose, but in its Example, a filament glass fiber is used in a urethane-based resin.

JP-A 2008-202012 discloses an invention on a long fiber-reinforced thermoplastic resin composition obtained by blending 11 to 200 parts by weight of a reinforcement fiber relative to 100 parts by weight of a composition composed of a polycarbonate resin (PC) and a styrene-based resin (SR).

It discloses to contain, as a reinforcement fiber, at least one kind of fibers selected from the group consisting of inorganic fibers made of glass, carbon, silicon carbide, basalt or boron; metal fibers made of stainless steel; organic fibers made of aramid, rayon, nylon, polynaphthalate, or polyester; and cellulose fibers, but in its Example, a glass fiber is used.

JP-A 2013-91775 (WO-A1 2013/051369) discloses an invention of a fiber-reinforced resin composition, which includes a resin-impregnated fiber bundle of a thermoplastic resin and a rayon fiber, and it discloses that a molded article with a good mechanical strength can be obtained.

SUMMARY OF INVENTION

An object of the present invention is to provide a fiber-reinforced resin composition, which can provide a lightweight molded article with good mechanical properties, and a molded article obtained therefrom.

The present invention provides, in one aspect thereof, a fiber-reinforced resin composition, which contains a resin-adhered long fiber bundle including (A) a thermoplastic resin and (B) a rayon fiber, wherein:
the rayon fiber of the component (B) satisfies the following requirements (b1) and (b2); and
the resin-adhered long fiber bundle is obtained by adhering and integrating the thermoplastic resin of the component (A) in a molten state to and with a strand of longitudinally-arranged rayon fibers of the component (B), and then cutting the strand into a length of 3 to 30 mm,
  (b1) a fiber diameter of 5 to 30 μm; and
  (b2) a tensile elongation of 10% or more.

Further, the present invention provides, in another aspect thereof, a fiber-reinforced resin composition, which contains a resin-adhered long fiber bundle including (A) a thermoplastic resin and (B) a rayon fiber, wherein: the rayon fiber as the component (B) satisfies the following requirements (b1) and (b3); and the resin-adhered long fiber bundle is obtained by adhering and integrating the thermoplastic resin of the component (A) in a molten state to and with a strand of longitudinally-arranged rayon fibers of the component (B), and then cutting the strand into a length of 3 to 30 mm,
  (b1) a fiber diameter of 5 to 30 μm; and
  (b3) a flat shape with a ratio between a major axis length and a minor axis length (major axis length/minor axis length) in a width-directional (radial-directional) cross section of 1.1 or more.

Furthermore, the present invention provides, in yet another aspect thereof, a fiber-reinforced resin composition, which contains a resin-adhered long fiber bundle including (A) a thermoplastic resin and (B) a rayon fiber, wherein:
the rayon fiber as the component (B) satisfies the following requirements (b1), (b2) and (b3); and
the resin-adhered long fiber bundle is obtained by adhering and integrating the thermoplastic resin of the component (A) in a molten state to and with a strand of longitudinally-arranged rayon fibers of the component (B), and then cutting the strand into a length of 3 to 30 mm,
  (b1) a fiber diameter of 5 to 30 μm;
  (b2) a tensile elongation of 10% or more; and
  (b3) a flat shape with a ratio between a major axis length and a minor axis length (major axis length/minor axis length) in a width-directional cross section of 1.1 or more.

A molded article obtained from the composition of the present invention is lightweight and has excellent mechanical properties.

BRIEF DESCRIPTION OF DRAWINGS

The present invention may be more completely understood by the following detailed description and the accompanying drawings, which are given only for explanation and do not limit the present invention.

DETAILED DESCRIPTION OF THE INVENTION

<Fiber-Reinforced Resin Composition>
The composition of the present invention contains a resin-adhered long fiber bundle (resin-adhered rayon long fiber bundle) containing a component (A) and a component (B), and may be composed only of the resin-adhered long fiber bundle, or may contain other components as necessary.

The resin-adhered long fiber bundle contained in the composition of the present invention is preferably either of the following (I) and (II),
(I) one which is integrated by covering the surface of a strand of longitudinally-arranged rayon fibers of the component (B) with the thermoplastic resin of component (A) in a molten state and impregnating the resin into the rayon fiber strand.

(II) one which is integrated by covering the surface of a strand of longitudinally-arranged rayon fibers of component (B) with the thermoplastic resin of component (A) in a molten state without impregnating the resin into the rayon fiber strand.

Component (A)

Examples of the thermoplastic resin of component (A) include a polyolefin-based resin, a polyamide-based resin, a styrene-based resin, a polycarbonate resin, polyvinyl chloride, polyvinylidene chloride, a polycarbonate-based resin, an acrylic resin, a methacrylic resin, a polyester-based resin, a polyacetal-based resin, and a polyphenylene sulfide-based resin.

As the thermoplastic resin of component (A), preferable are those containing a resin selected from polyolefin-based resins and polyamide-based resins; and more preferable are those selected from polyolefin-based resins and polyamide-based resins.

As the polyolefin-based resin, usable are polypropylene; high-density, low-density and linear low-density polyethylenes; poly-1-butene; polyisobutylene; a copolymer of ethylene and propylene; ethylene-propylene-diene terpolymer (the diene component as a raw material being in an amount of 10% by mass or less); polymethylpentene; random, block, and graft copolymers of ethylene or propylene (50% by mole or more) with other copolymerizable monomer (vinyl acetate, an alkyl ester of methacrylic acid, an alkyl ester of acrylic acid, aromatic vinyl, etc.), and the like. Among these, preferable is polypropylene.

When a polyolefin-based resin is used as component (A), an acid-modified polyolefin is preferably used together for easy impregnation into the rayon fiber strand of component (B).

As the acid-modified polyolefin, preferable are maleic acid-modified polyolefin (maleic acid-modified polypropylene), and maleic anhydride-modified polyolefin (maleic anhydride-modified polypropylene).

When an acid-modified polyolefin is used together as the component (A), it is preferably blended such that an acid amount (amount of an acid contained in the acid-modified polyolefin in component (A)) in component (A) is in the range of 0.005 to 0.5% by mass on average in terms of maleic anhydride.

As the polyamide-based resin, preferable is one selected from aliphatic polyamides and aromatic polyamides.

Examples of the aliphatic polyamides include polyamide 6, polyamide 66, polyamide 69, polyamide 610, polyamide 1010, polyamide 612, polyamide 46, polyamide 11, polyamide 12, and the like.

Examples of the aromatic polyamides include those obtained from an aromatic dicarboxylic acid and an aliphatic diamine, and those obtained from an aliphatic dicarboxylic acid and an aromatic diamine, such as Nylon MXD (metaxylylenediamine and adipic acid), Nylon 6T (hexamethylenediamine and terephthalic acid), Nylon 6I (hexamethylenediamine and isophthalic acid), Nylon 9T (nonanediamine and terephthalic acid), Nylon M5T (methylpentadiamine and terephthalic acid), and Nylon 10T (decamethylenediamine and terephthalic acid).

Among these, preferable is an aliphatic polyamide such as polyamide 6, polyamide 69, polyamide 610, polyamide 612, polyamide 11, polyamide 12 and polyamide 1010.

Component (B)

The rayon fiber of component (B) satisfies any combination selected from combinations of: requirements (b1) and (b2); requirements (b1) and (b3); and requirements (b1), (b2) and (b3).

When a monofilament rayon fiber satisfying the above requirements is used as the rayon fiber of component (B), a molded article obtained from the composition has an improved mechanical strength.

With respect to the requirement (b1), the fiber diameter is 5 to 30 μm, preferably 6 to 20 μm, more preferably 7 to 15 μm. In this connection, when the rayon fiber of component (B) has a cross-section of a flat shape, the fiber diameter may be a number average fiber diameter obtained by converting the flat shape of the cross-section into a perfect circle with the same area as the shape of the cross-section. The fiber diameter can be calculated by an image analyzer from an image observed by an optical microscope.

With respect to the requirement (b2), the tensile elongation is preferably 10% or more, more preferably 10 to 20%, and further preferably 10 to 16%. The tensile elongation is measured by a method described in Examples.

With respect to the requirement (b3), the ratio between a major axis length and a minor axis length (major axis length/minor axis length) in a width-directional cross-section is 1.1 or more, preferably 1.1 to 3.0, and more preferably 1.2 to 1.8. Major and minor axis lengths are measured by a method described in Examples.

In addition to each of the above requirements, a rayon fiber of the component (B) satisfying each of the following requirements may be used.

A rayon fiber has a tensile strength of preferably 35 MPa or more, more preferably 40 to 80 MPa, and further preferably 40 to 60 MPa.

A rayon fiber has a wettability of preferably 20 to 80%, more preferably 30 to 60%, and further preferably 40 to 55%.

A rayon fiber having an X-ray orientation degree of 90% or more is preferred.

As the rayon fiber of the component (B), the above rayon fiber (B1) and a rayon fiber (B2) satisfying the following requirements (b11) to (b13) may be used together.

The requirement (b11) pertains to a fiber diameter, which is 5 to 30 μm, preferably 6 to 20 μm, and more preferably 7 to 15 μm.

The requirement (b12) pertains to an X-ray orientation degree, which is 86% or more, and preferably 90% or more.

The X-ray orientation degree is calculated from equations described in paragraph numbers 0012 and 0013 of JP-A 9-31744, and paragraph numbers 0020 and 0021 of JP-A 9-256216; and the disclosure of paragraph number 0038 of JP-A 2013-91775.

The requirement (b13) pertains to a tensile elongation, which is from 2% to less than 10%.

In addition to the requirements (b11) to (b13), a rayon fiber satisfying a requirement for tensile modulus (Young's modulus), which is preferably 10 GPa or more, more preferably 13 GPa or more, and further preferably 15 GPa or more, may be used. The Young's modulus is obtained from the disclosure of paragraph number 0038 of JP-A 2013-91775.

When the rayon fiber (B1) and other rayon fiber (B2) are contained as the rayon fiber of the component (B), the content of the component (B1) relative to the total amount of (B1) and (B2) is preferably 70% by mass or more, more preferably 80% by mass or more, and further preferably 90% by mass or more.

As the rayon fiber of the component (B), usable are those described in Lenzinger Berichte 87 (2009), pages 98 to 105, for example, viscose rayon, polynosic, modal, cupra, lyocell (Tencel), and Bocell or FORTIZAN (manufactured by CELANESE Co., Ltd.; a fiber obtained by expanding a cellulose acetate and then saponifying with alkali).

The rayon fiber of the component (B) has a stronger activity of the fiber surface and a higher reactivity than a natural cellulose fiber or the like having a high crystallinity. Therefore, in order to further enhance the effect obtained by including the component (B), it is preferable to use together an acid-modified polyolefin as the component (A). Containing the acid-modified polyolefin as the component (A) enhances the interface strength between the rayon fiber and the resin of component (A), further enhancing its physical properties and simultaneously further increasing the improvement effects of physical properties obtained by making the fiber long.

Resin-Adhered Long Fiber Bundle

The resin-adhered long fiber bundle can be obtained by adhering the thermoplastic resin of component (A) in a molten state to a strand of the 2,000 to 30,000 longitudinally-arranged rayon fibers of component (B) and integrating them with each other.

The resin-adhered long fiber bundle can be produced by a well-known production method using a die, and applicable production methods are disclosed in, for example, paragraph number 7 of JP-A 6-313050, paragraph number 23 of JP-A 2007-176227, and others such as JP-B 6-2344 (Method for manufacturing resin-coated long fiber bundle and molding method), JP-A 6-114832 (Fiber-reinforced thermoplastic resin structure and manufacturing method thereof), JP-A 6-293023 (Method for manufacturing long fiber-reinforced thermoplastic resin composition), JP-A 7-205317 (Method for taking out fiber bundle and producing long fiber-reinforced resin structure), JP-A 7-216104 (Method for manufacturing long fiber-reinforced resin structure), JP-A 7-251437 (Method and device for manufacturing long fiber-reinforced thermoplastic composite material), JP-A 8-118490 (Crosshead die and method for manufacturing long fiber-reinforced resin structure), and the like.

The above-described resin-adhered long fiber bundles (I) and (II) can be each produced by adjusting an amount of molten resin to be supplied and a time period for processing.

The length of the resin-adhered long fiber bundle (namely, the length of the rayon fiber of component (B) contained in the resin-adhered long fiber bundle) is in the range of 3 to 30 mm, preferably 5 mm to 30 mm, and more preferably 6 mm to 25 mm. A length of 3 mm or more can enhance the mechanical strength of a molded article obtained from the composition, and a length of 30 mm or less provides a good moldability.

As to a ratio between the amounts of component (A) and component (B) in the resin-adhered long fiber bundle, component (A) is present in an amount of preferably 95 to 30% by mass, more preferably 90 to 40% by mass, and further preferably 80 to 40% by mass; and component (B) is present in an amount of preferably 5 to 70% by mass, more preferably 10 to 60% by mass, and further preferably 20 to 60% by mass.

The fiber-reinforced resin composition of the present invention may contain other known fire retardants and fire-resistant aids, a thermostabilizer, a lubricant, a light stabilizer, an antioxidant, a colorant, a mold lubricant, an antistatic agent within such a range that can solve the problem of the present invention.

Those components may be contained in the resin-impregnated long fiber bundle, or may be contained separately from the resin-impregnated long fiber bundle.

<Molded Article Composed of the Fiber-Reinforced Resin Composition>

The molded article of the present invention is obtained by molding the fiber-reinforced resin composition including the aforementioned resin-adhered long fiber bundle.

In obtaining the molded article of the present invention, further to the fiber-reinforced resin composition including the aforementioned resin-adhered long fiber bundle, the thermoplastic resin of the above-mentioned component (A) can be added as necessary.

Since the resin-adhered long fiber bundle included in the fiber-reinforced resin composition of the present invention has a good dispersibility in a molten resin, the rayon fiber of the component (B) can be uniformly dispersed in the obtained molded article.

When molding the fiber-reinforced resin composition including the resin-adhered long fiber bundle of the present invention, it is inevitable that a force applied at the time of molding breaks and shortens the rayon fibers contained in the resin-adhered long fiber bundle. However, the present invention uses rayon fibers having a good tensile elongation, thereby providing a high fiber strength and preventing the rayon fiber from being shortened by the above-mentioned breakage.

In addition, the fiber itself has a high strength and elastic modulus, thereby increasing the mechanical strength (bending modulus or the like) of the obtained molded article.

Furthermore, since the molded article obtained from the fiber-reinforced resin composition of the present invention is lightweight in comparison with one containing an inorganic fiber, such as glass fiber (namely, being able to lower its density), a molded article having a large specific modulus (bending modulus/specific gravity) can be obtained.

In addition, for example, when a comparison between a rayon long fiber-containing polypropylene molded article and a glass long fiber-containing polypropylene molded article is made, a specific modulus becomes larger as the blending amount of the rayon fiber or glass fiber becomes larger, and a degree of specific modulus of the rayon long fiber-containing polypropylene molded article is larger.

With respect to the molded article obtained from the fiber-reinforced resin composition of the present invention, the molded article with a thickness of 4 mm preferably has a specific modulus of 4,000 MPa or more, more preferably 4,500 MPa or more, and further preferably 5,000 MPa or more.

The molded article of the present invention can be made into a desired shape depending on the intended use, and the specific modulus can be increased as mentioned above. Thus, when an article is molded into a thin plate-like shape, a molded article which is lightweight and has a high mechanical strength can be obtained.

In the case that the molded article of the present invention is formed into a thin plate shape, even when the article has a thickness of 1 to 5 mm, for example, the article can provide a high mechanical strength.

In addition, as the molded article obtained from the fiber-reinforced resin composition of the present invention contains the rayon fiber, no combustion residue like glass fiber remains when the article is burnt.

Since the molded article of the present invention is lightweight and has a high mechanical strength (especially specific modulus), it is usable as a substitute for metal parts used in the various fields of electric and electronic equipment, communication equipment, automobile, building material, daily needs, etc., and is especially suitable for housings of various devices and plate-like sheathing materials.

EXAMPLES

Production Example 1 (Production of the Resin-Impregnated Long Fiber Bundle)

Resin-impregnated long fiber bundles used in Examples 1 to 3 and Comparative Examples 1 and 2 shown in Table 1 were produced.

A strand of fibers made of long rayon fibers (having a fineness shown in Table 1) was passed through a crosshead die. At this time, a molten component (A) shown in Table 1 was supplied to the crosshead die from a biaxial extrusion machine (cylinder temperature of 250° C.) in an amount shown in Table 1, and the rayon fiber strand was impregnated with the molten component.

Thereafter, the resultant product was shaped by a shaping nozzle at an exit of the crosshead die and a shape thereof was adjusted by shaping rolls, and then, cut into a predetermined length (length of the fiber bundle in Table 1) by a pelletizer, so that a resin-impregnated long fiber bundle (long fiber bundle (I)) in a pellet shape (cylindrical shape) was obtained.

When the resin-impregnated long fiber bundles thus obtained were cut and checked, Examples 1 to 3 and Comparative Examples 1 and 2 had rayon fibers substantially parallel in the length direction and impregnated up to their center portions with the resin.

Examples 1 to 3 and Comparative Examples 1 and 2

A composition composed of the resin-impregnated long fiber bundles obtained by the Production Example 1 was obtained.

<Components to be Used>
Component (A)
  PP (polypropylene): J139 (manufactured by Prime Polymer Co., Ltd.)
  Acid-modified PP: OREVAC CA100 (manufactured by ATOFINA Japan Co., Ltd.), 1.0% maleic anhydride-modified
  PA1010: VESTAMID BS1393 natural (product name) (manufactured by Daicel-Evonik Ltd.)
  PA610: VESTAMID BS1177 (product name) (manufactured by Daicel-Evonik Ltd.)
Component (B)
  Monofilament rayon fibers 1 (CR500TEX manufactured by Cordenka GmbH & Co.) and rayon fibers 2 and 3 shown in Table 1 were used.

Figure 1:
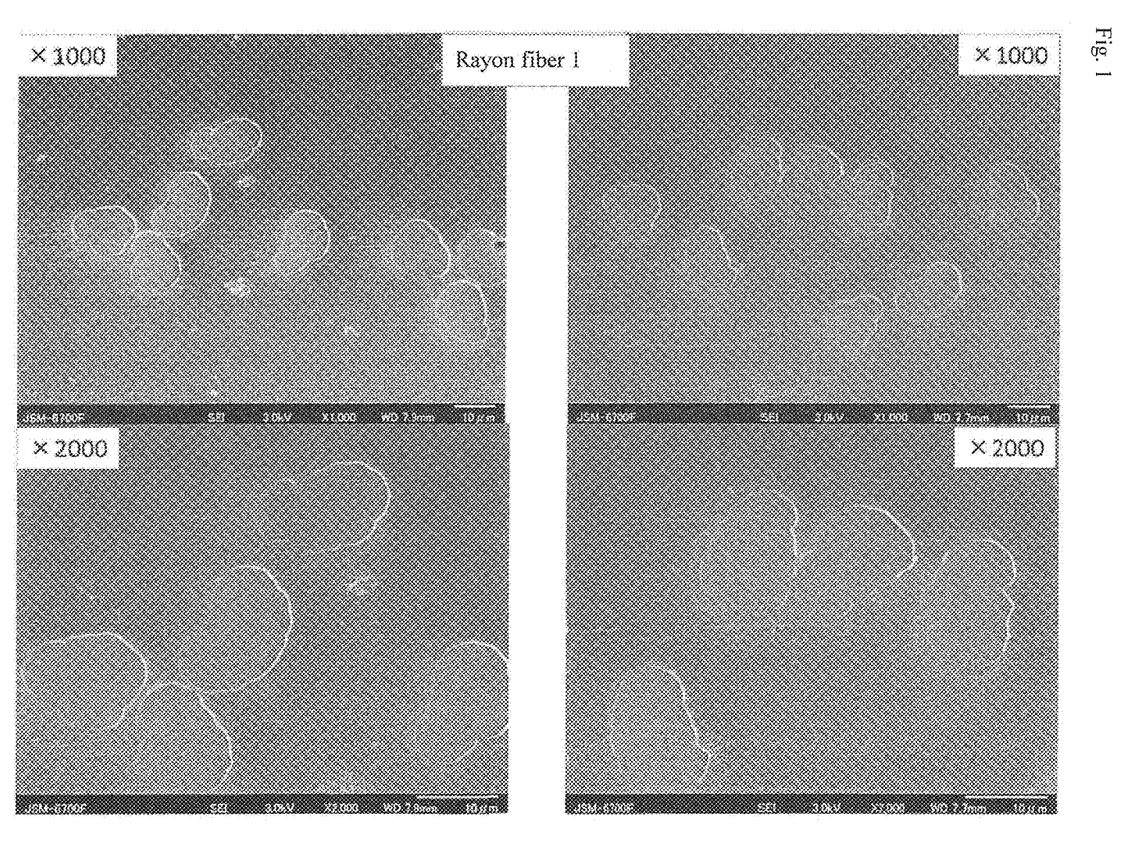
FIG. 1 is an SEM photograph showing a width-directional cross section of rayon fibers 1 used in Examples.
Figure 2:
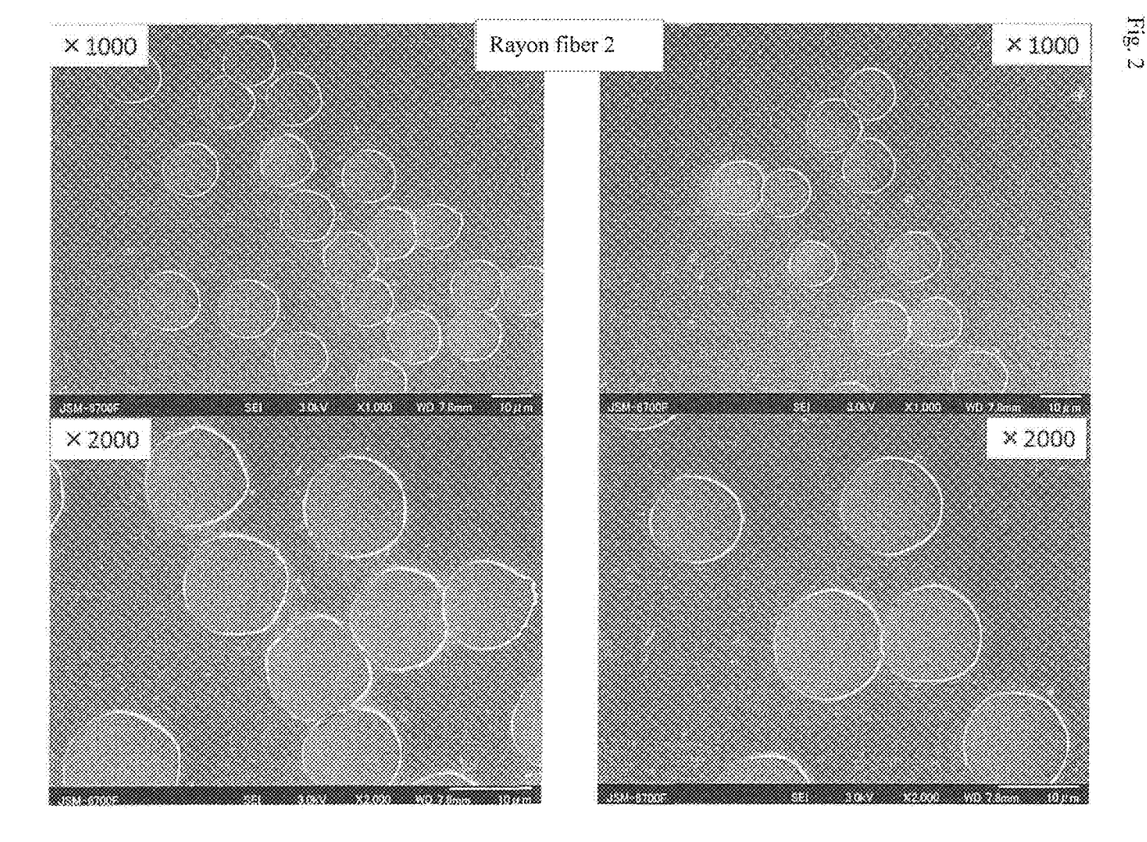
FIG. 2 is an SEM photograph showing a width-directional cross section of rayon fibers 2 used in Comparative Example 1.
Figure 3:
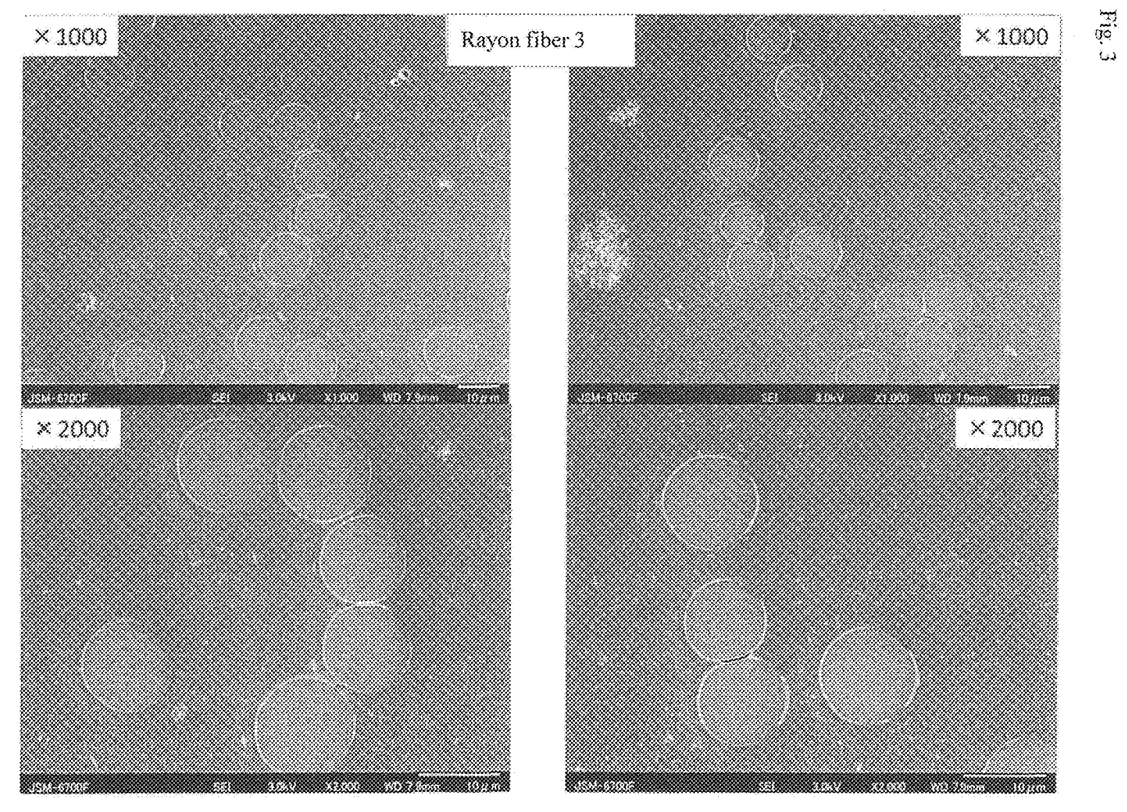
FIG. 3 is an SEM photograph showing a width-directional cross section of rayon fibers 3 used in Comparative Example 2.

The rayon fibers 1 had a width-directional cross-section of a flat shape (FIG. 1) while the cross-sectional shapes in the width direction of the rayon fibers 2 and 3 were circular (FIGS. 2 and 3).

In Comparative Examples 3 and 4, wood pulp (Pulp NDP-T manufactured by Nippon Paper Industries Co., Ltd.; fiber diameter of 25 μm, average fiber length of 1.8 mm) was used instead of the rayon fibers 1 to 3 in amounts (% by mass) shown in Table 2, so that granular particles containing wood pulp (cellulose fiber) were obtained in the same manner as in Comparative Example 2 of International Publication No. WO2013/051369. However, the polyamide shown in Table 2 was used instead of polypropylene or MPP (acid-modified PP).

TABLE 1

|  | Rayon fiber 1 | Rayon fiber 2 | Rayon fiber 3 |
|---|---|---|---|
| Fineness (dtex)*1 | 4580 | 30200 | 2350 |
| (b1) Fiber diameter (μm) | 10 to 15 | 11 to 12 | 12 to 13 |
| (b2) Tensile elongation (%) | 13.4 | 9.2 | 4.7 |
| (b3) Major axis/minor axis | 1.46 | 1.04 | 1.04 |
| X-ray orientation degree (%) | 92 | 91 | 93 |
| Tensile strength (MPa) | 46 | 38 | 91 |
| Wettability (%) | 51 | 59 | 37 |

*1 measured with a sample length of 10 cm after 1-hour drying at 70° C.

<Measurement Methods for Rayon Fibers>
(1) Measurement of Major and Minor Axes

A rayon fiber was embedded in an epoxy resin, a cross section thereof was obtained by a microtome and an SEM photograph was taken (FIGS. 1 to 3). From SEM photographs, major and minor axes were measured by the following method.

Figure 4:
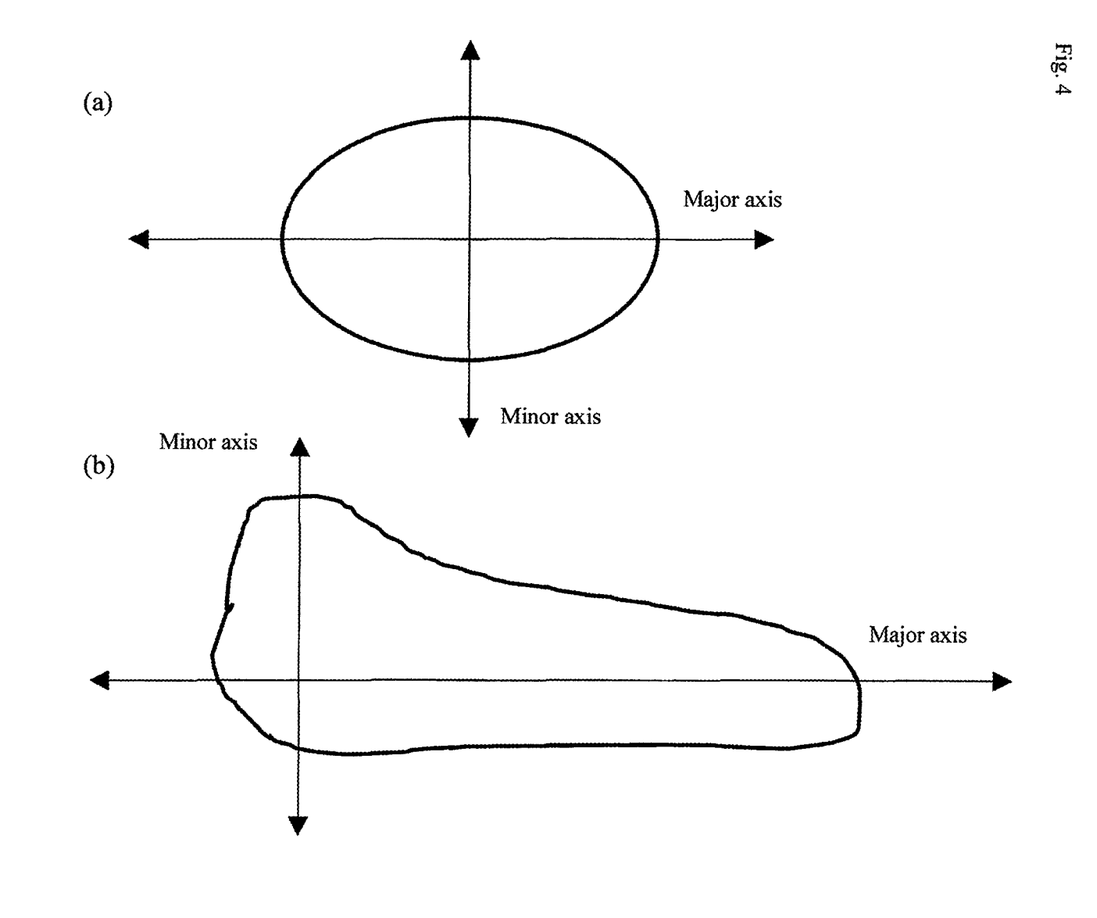
FIG. 4 is an explanatory view on a method for measuring a ratio between a major axis length and a minor axis length in the requirement (b3).

When a flat shape is elliptical, lengths of major and minor axes shown in FIG. 4(a) were measured.

When a flat shape is indefinite, the longest portion was taken as the major axis and the shortest portion of a line (axis) perpendicular to the major axis was taken as the minor axis as shown in FIG. 4(b).

Major axis lengths and minor axis lengths of 100 rayon fibers were measured, and a number average thereof was used to calculate a ratio between a major axis length and a minor axis length (major axis length/minor axis length).

(2) Tensile Strength

After 1-week humidity adjustment at 23° C. and 50% RH, a tensile strength was measured at a sample fiber length of 2.5 cm and a crosshead speed of 2.5 cm/min.

(3) Tensile Elongation

After a 1-week humidity condition at 23° C. and 50% RH, a tensile elongation was measured at a sample fiber length of 2.5 cm and a crosshead speed of 2.5 cm/min.

(4) Wettability Test 0.03 to 0.06 g of rayon fiber was used as a sample fiber. The sample fiber was dried in vacuum at 50° C., and weighed by an electronic balance.

The sample fiber was soaked in pure water in a petri dish at room temperature (20 to 25° C.) for one minute.

The sample fiber was taken out from the pure water and centrifuged (10,000 r/m, 10 minutes), and then, weighed by an electronic balance. The wettability was calculated based on the following equation.

Wettability (%)=(Mass after centrifugation−mass after vacuum drying)/mass after vacuum drying×100

<Molded Article>
(Method for Preparing Test Specimen)

Under the following conditions, an ISO multi-purpose test specimen of Type A (2 mm thickness) was prepared, and used as a test specimen for each of the following measurements.

Equipment: J-150EII manufactured by The Japan Steel Works LTD.
Cylinder temperature: 230° C.
Die temperature: 50° C.
Screw: long fiber-only screw
Screw diameter: 51 mm
Gate shape: side gate with 20 mm width (1) Tensile Strength (MPa)
  Measured in accordance with ISO 527
(2) Tensile Elongation (%)
  Measured in accordance with ISO 527
(3) Bending Strength (MPa)
  Measured in accordance with ISO 178
(4) Bending Modulus (MPa)
  Measured in accordance with ISO 178
(5) Charpy Impact Strength (kJ/m$^2$)
  A notched Charpy impact strength was measured in accordance with ISO 179/1eA.
(6) Deflection Temperature Under Load (° C.)
  Measured in accordance with ISO 75

TABLE 2

|  |  |  |  | Examples | | | | | Comparative Examples | | | |
| --- | --- | --- | --- | --- | --- | --- | --- | --- | --- | --- | --- | --- |
|  |  |  |  | 1 | 2 | 3 | 4 | 5 | 1 | 2 | 3 | 4 |
| Composition | (A) | PP | % by mass | 64 | 56 | 53 |  |  | 64 | 72 |  |  |
|  |  | Acid-modified PP (in terms of maleic anhydride) | % by mass | 2 | 2 | 2 |  |  | 2 | 2 |  |  |
|  |  | PA1010 | % by mass |  |  |  | 70 |  |  |  | 70 |  |
|  |  | PA610 | % by mass |  |  |  |  | 70 |  |  |  | 70 |
|  | (B1) | Rayon fiber 1 | % by mass | 34 | 42 | 45 | 30 | 30 |  |  |  |  |
|  | (B2) | Rayon fiber 2 | % by mass |  |  |  |  |  | 34 |  |  |  |
|  |  | Rayon fiber 3 | % by mass |  |  |  |  |  |  | 26 |  |  |
|  |  | Length of fiber bundle | mm | 11 | 11 | 11 | 11 | 11 | 11 | 9 |  |  |
|  |  | Wood pulp | % by mass |  |  |  |  |  |  |  | 30 | 30 |
| Molded article |  | Specific gravity | — | 1.04 | 1.09 | 1.10 | 1.13 | 1.17 | 1.05 | 1.01 | 1.14 | 1.18 |
|  |  | Tensile strength | Mpa | 126 | 141 | 145 | 103 | 130 | 94 | 75 | 59 | 66 |
|  |  | Elongation | % | 5.5 | 4.5 | 4.6 | 3.5 | 4.3 | 3.9 | 2.8 | 4 | 3 |
|  |  | Bending strength | MPa | 155 | 182 | 187 | 163 | 169 | 135 | 105 | 88 | 101 |
|  |  | Bending modulus | MPa | 5500 | 6250 | 6410 | 5140 | 5850 | 6215 | 5300 | 3400 | 4100 |
|  |  | Charpy impact strength | KJ/m2 | 50 | 61 | 55 | 44 | 22 | 9 | 5 | 5 | 3 |
|  |  | Deflection temperature under load | ° C. | 158 | 160 | 161 | 184 | 204 | 160 | 150 | 104 | 125 |

Since Examples 1 to 5 used the rayon fiber 1 with a good tensile elongation, they were good particularly in the tensile strength, elongation, bending strength and impact strength.

The present invention has been described above. It is natural that various modifications are included within the scope of the present invention, and these modifications do not depart from the scope of the present invention. In addition, all that is obviously taken as modifications of the present invention by those skilled in the art is within the scope of the Claims described below.

The invention claimed is:

1. A fiber-reinforced resin composition comprising a resin-adhered long fiber bundle including a thermoplastic resin of a component (A), and monofilament rayon fibers of a component (B), wherein:
  the thermoplastic resin component of the component (A) does not comprise a polycarbonate resin or a polycarbonate-based resin,
  each of the monofilament rayon fibers of the component (B) satisfies the following requirements (b1), (b2) and (b3), and
  the resin-adhered long fiber bundle has a cut length of 3 to 30 mm and comprises the thermoplastic resin of the component (A) adhered to and integrated with a strand of the monofilament rayon fibers of the component (B) that are longitudinally-arranged,
  (b1) a fiber diameter of 5 to 30 μm;
  (b2) a tensile elongation of 10% or more; and
  (b3) a flat shape with a ratio of major axis length/minor axis length in a width-directional cross section of 1.1 to 1.8.

2. The fiber-reinforced resin composition according to claim 1, wherein the resin-adhered long fiber bundle is integrated by covering the surface of the strand of the monofilament rayon fibers of the component (B) that are longitudinally-arranged with the thermoplastic resin of the component (A) in a molten state and impregnating the resin into the rayon fiber strand.

3. The fiber-reinforced resin composition according to claim 1, wherein the resin-adhered long fiber bundle is integrated by covering the surface of the strand of the monofilament rayon fibers of the component (B) that are longitudinally-arranged with the thermoplastic resin of the component (A) in a molten state without impregnating the resin into the rayon fiber strand.

4. The fiber-reinforced resin composition according to claim 1, wherein the tensile elongation for the requirement (b2) is 10 to 20%.

5. The fiber-reinforced resin composition according to claim 1, wherein the thermoplastic resin of the component (A) comprises one selected from polyolefin resins and polyamide resins.

6. The fiber-reinforced resin composition according to claim 5, wherein the polyolefin resin of the thermoplastic resin of the component (A) comprises polypropylene, and maleic acid-modified polypropylene and/or maleic anhydride-modified polypropylene, and an acid amount in the component (A) is 0.005 to 0.5% by mass on average in terms of maleic anhydride.

7. The fiber-reinforced resin composition according to claim 5, wherein the polyamide resin of the thermoplastic resin of the component (A) is selected from polyamide 6, polyamide 69, polyamide 610, polyamide 612, polyamide 11, polyamide 12, and polyamide 1010.

8. A molded article obtained from the fiber-reinforced resin composition according to claim 1.

9. The fiber-reinforced resin composition according to claim 1, wherein the resin-adhered long fiber bundle is integrated by covering the surface of the strand of the monofilament rayon fibers of the component (B) that are longitudinally-arranged with the thermoplastic resin of the component (A) in a molten state and impregnating the resin into the rayon fiber strand.

* * * * *